April 8, 1958  E. W. COWAN  2,830,287

CATHODE RAY TUBE PRESENTATION

Filed March 26, 1946

INVENTOR.
EUGENE W. COWAN
BY
ATTORNEY

United States Patent Office 2,830,287
Patented Apr. 8, 1958

2,830,287

CATHODE RAY TUBE PRESENTATION

Eugene W. Cowan, Columbia, Mo., assignor, by mesne assignments, to the United States of America as represented by the Secretary of the Navy Application March 26, 1946, Serial No. 657,187

8 Claims. (Cl. 343—11)

This invention relates to pulse echo systems, and more particularly to indicating apparatus.

The successful interception of enemy aircraft is of vital importance in time of war. During the day time, under favorable weather conditions, interceptor planes can be guided by fighter director operations to the vicinity of hostile aircraft, and can complete the interception by visual means. At night, and under conditions of poor visibility, and to augment fighter director apparatus, interceptor aircraft must carry pulse-echo (radar) systems to be effective. Simplicity is of prime importance in the design considerations for such aircraft interception systems. Frequently the pilot must operate the radar in additional to his other duties, so the operation of and indication presented by the radar must be as simple as possible.

For successful interception the pilot needs information as to the range, azimuth and elevation of a target. The type of presentation used should present these three coordinates simultaneously and in a manner which is easy to interpret.

Another important factor which influences the choice of type of presentation is the effect of sea return. Energy returned from the surface of the sea produces indications on the scope which result in "blind volumes," or regions within which aircraft can not be detected even though within maximum range and in the volume reached by the antenna scan.

One of these bland regions, arbitrarily called the "upper blind volume," is produced in existing systems at approximately twice the altitude of the searching plane by the combined effects of the type of scan and the method of data presentation. To illustrate, taking a specific example, an airplane flying very close to the surface of the sea may be hidden by sea return in either of two ways: (1) the energy returned from the sea may saturate the receiver during the time the target pulse is received, or (2) the target pulse may be present in the video output, but hidden by the spiky nature of the sea return or by its movement on the screen as the antenna scans. Suppose that the type of presentation used is essentially a "B" presentation, where azimuth is plotted horizontally and range vertically. All range sweeps starting when the axis of the antenna is in a zero-azimuth plane will be along the same line on the screen regardless of whether the antenna is pointed up or down. With the scanner rotating at a high rate of speed, the axis of the scanner passes from zero azimuth below the horizontal to zero azimuth above the horizontal in a fraction of a second. Both of these positions of the scanner correspond to range sweeps along the same line in the center of the screen, and the persistence of the screen and eye permit the light from the sea return when the scanner is pointed down to obscure part of the range sweep the fraction of a second later when the scanner is pointed up. A similar reasoning holds for vertical planes at other than zero azimuth.

In some presentations, where the video signals from alternate cycles are used to give an indication of elevation, the data is simply presented but the signal-to-noise ratio suffers, since the target pulses hit two spots on the screen instead of only one, while the density of noise spots is the same.

It is, therefore, the object of the present invention to provide indication apparatus which will simultaneously give range, azimuth and elevation data.

Another object is to provide indication apparatus which will eliminate the "upper blind volume."

A further object is to provide indication apparatus wherein target signals strike only one spot on the scope screen, thereby giving optimum signal-to-noise ratio.

These and other objects will be more apparent upon consideration of the following specification, taken in connection with the accompanying drawing, forming a part thereof, in which.

Figure 1:
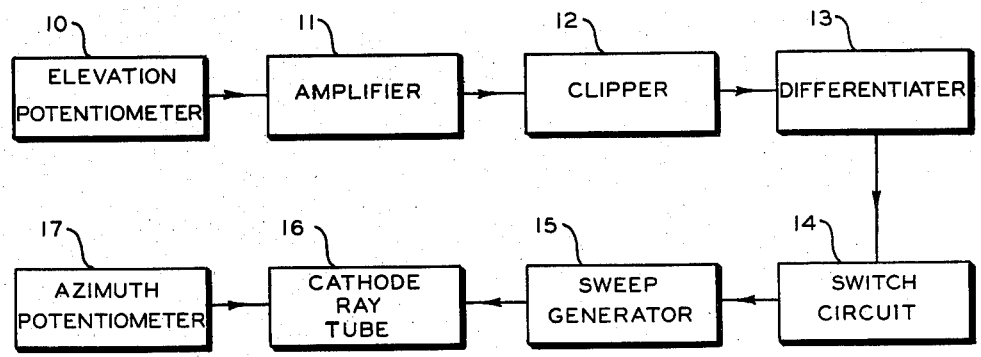
Fig. 1 is a block diagram of one embodiment of the invention.

Briefly, azimuth and range are presented as in "type B" scan, except that sweeps start at a horizontal reference line across the center of the tube. Data from elevation potentiometer 10 is amplified at 11, clipped at 12, differentiated at 13, and the resulting triggers are used to operate switch circuit 14, which either inverts or rights the sweep from sweep generator 15, depending on the polarity of the triggers. Positive triggers initiate a sweep which sweeps upward from the center reference line, whereas negative triggers cause an inversion so that the sweep moves downward from the reference line. Thereby a sweep is produced which starts up or down depending on whether the axis of the scanner is pointed respectively up or down. Azimuth information is supplied by azimuth potentiometer 17.

More specifically, the type of scan herein disclosed may be termed a modified "B" scan. In conventional "type B" scan, the azimuth (bearing) and the range of reflecting objects are presented on the screen of the tube as abscissa and ordinate, respectively. The spot, or rather the potential spot that would appear if the grid control of the cathode ray tube were to turn on the electron beam, is given a horizontal motion synchronously with the rotation of the antenna, corresponding to at least a portion of the angle of rotation of the antenna system. An azimuth potentiometer is commonly used to supply a voltage which moves the spot along the abscissa as a function of the bearing of the antenna. A uniform vertical motion from bottom to top of the screen is also imparted to the scanning spot, a conventional linear sweep generator being used, each vertical line being synchronized with a transmitted pulse for an indication of range. The spot is maintained at very low intensity, and received signals are impressed on the grid of the cathode ray tube to intensify the spot and cause a bright area to appear on the screen at a point representing the azimuth and range of the target. This modified scan differs in that all range sweeps start at a center reference line, and move either up or down, depending on whether the axis of the antenna is pointing up or down respectively.

It will be obvious to one skilled in the art that there are a multitude of methods whereby this presentation may be obtained. One workable method can be outlined as follows. A voltage proportional to the elevation angle of the scanner may be obtained from an elevation potentiometer 10. This voltage is amplified at 11, in the present embodiment amplifier 11 consisting of one stage thereby accounting for an inversion of the input signal. The resulting output is clipped at 12, this clipper stage consisting of an overdriven amplifier which effectively squares off both the positive and negative swings of its input signal. The output of clipper 12 is differentiated at 13, and the resulting triggers used to operate switch circuit 14. This circuit may comprise a flip-flop multivibrator, or similar device, which inverts or rights the sweeps from linear sweep generator 15, depending on the polarity of the triggers. The range sweeps are applied to cathode ray tube 16. Thus, if the antenna axis is elevated, a positive trigger is fed to the switch circuit, which initiates a range sweep which starts upward from the center reference line on the screen. If the antenna axis is depressed, a negative trigger is fed to the switch circuit, which initiates a range sweep which starts downward from the center reference line. Azimuth information is supplied cathode ray tube 16 by azimuth potentiometer 17.

Figure 2:
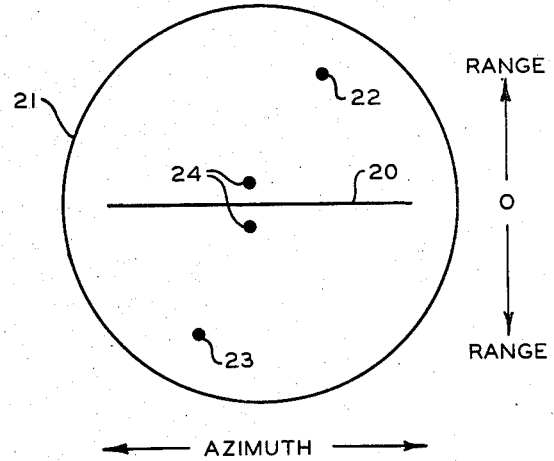
Fig. 2 is a sketch of the type of scope presentation obtained.

The presentation resulting from such an arrangement appears as shown in Fig. 2. Center reference line 20 on cathode ray screen 21 represents zero range. Target 22 represents a reflecting object which is above and to the right, whereas target 23 represents a reflecting object which is below and to the left. The circuits may be so arranged that reflecting objects which are in the same horizontal plane as the axis of the antenna will produce two marks on the screen, as shown at 24, one above the center reference line, the other below. The two marks will approach the reference line as the target approaches in range.

Among the advantages of this system are the following: (1) ease of interpretation, with a target above and to the right appearing in the top half of the tube and to the right; (2) elimination of the "upper blind volume," since the sea return indication is confined to the lower half of the screen; (3) a precise indication of zero elevation, approaching the limitation imposed by the antenna beam width; and (4) an increase in signal-to-noise ratio over the so-called double-dot system, since the target pulses hit only one spot on the screen instead of two.

It is believed that the construction and operation of my invention, as well as the advantages thereof, will be apparent from the foregoing description. It will be understood that while I have shown and described my invention in a particular embodiment, changes may be made in the circuits disclosed without departing from the invention, as sought to be defined in the following claims.

What is claimed is:

1. In a pulse echo system having an antenna adapted to scan a beam of radiation above and below and in azimuth with respect to a reference axis, an indicator comprising a cathode ray tube, means for deflecting the electron beam of said cathode ray tube in a horizontal plane in proportion to the azimuthal position of said antenna, means for deflecting the electron beam in a vertical plane by a constant amount proportional to a predetermined target range, and means operative in response to movement of said antenna above and below said reference axis for reversing the direction of the deflection of said electron beam in the vertical plane.

2. In a pulse echo system including an antenna adapted to scan a beam of radiation above and below and in azimuth with respect to a reference axis, indicating apparatus comprising a cathode ray tube, means for deflecting the electron beam of said tube in a vertical plane by a constant amount proportional to a predetermined range, means operative in response to the elevational position of said antenna with respect to said reference axis for deflecting the electron beam in the vertical plane above or below a reference line, and means for moving said electron beam parallel to said reference line in accordance with the azimuthal position of said antenna.

3. In a pulse echo system including an antenna adapted to scan a beam of electromagnetic radiation through an azimuthal angle and above and below a reference plane passing through said antenna, an indicator comprising, a cathode ray tube having an electron beam therein and a horizontal reference line centrally located on the face thereof, means for deflecting said electron beam in a direction perpendicular to said reference line by a constant amount proportional to a predetermined range, means operative in response to movement of said antenna for deflecting said electron beam above or below said reference line depending on whether said antenna is directed above or below said reference plane, and means for moving said electron beam in a direction parallel to said reference line by an amount proportional to the azimuthal position of said antenna.

4. In a pulse echo system including an antenna adapted to scan a beam of radiation above and below a reference plane and in azimuth with respect to a reference axis lying in said reference plane, indicating apparatus comprising a screen, means for producing a spot of light on said screen, means to cause said spot of light to move across said screen in one direction in proportion to the azimuthal position of said antenna, and means operative in response to the elevational position of said antenna above or below said reference plane for moving said spot of light in quadrature with said one direction in a direction above or below a reference line by a constant amount proportional to a predetermined range.

5. In a pulse echo system including an antenna adapted to scan a beam of radiation above and below a reference plane and in azimuth with respect to a reference axis lying in said reference plane, indicating apparatus comprising a cathode ray tube having an electron beam, means for producing a series of constant length range sweeps starting at a base-line, means for moving said range sweeps along said base-line in accordance with the azimuthal position of said antenna, and means operative in response to the movement of said antenna above and below said reference plane for determining the direction of movement of said range sweeps from said base-line.

6. In a pulse echo system including an antenna adapted to scan a beam of radiation above and below a reference plane and in azimuth with respect to a reference axis lying in said reference plane, indicating apparatus comprising a cathode ray tube having an electron beam, a sweep generator coupled to said cathode ray tube for producing a series of sweeps of said beam starting at a base-line and extending therefrom a constant amount proportional to a predetermined range, means responsive to the azimuth motion of said antenna for moving said range sweeps along said base-line, and means coupled to said sweep generator and operative in response to the movement of said antenna above and below said reference plane for determining the direction of movement of said sweeps from said base-line.

7. Apparatus in accordance with claim 6 wherein said last-mentioned means includes circuit means for producing a series of switching pulses having one polarity when said antenna is scanning above said reference plane and having opposite polarity when said antenna is scanning below said reference plane.

8. Apparatus in accordance with claim 6 wherein said last-mentioned means comprises a potentiometer coupled to said antenna for producing a voltage proportional to the elevation angle of said antenna, and circuit means operative upon said voltage for producing a series of switching pulses having one polarity when said antenna is scanning above said reference plane and having opposite polarity when said antenna is scanning below said reference plane.

References Cited in the file of this patent

UNITED STATES PATENTS

| | | |
|---|---|---|
| 2,406,358 | Doba | Aug. 27, 1946 |
| 2,412,702 | Wolff | Dec. 17, 1946 |
| 2,412,703 | Wolff | Dec. 17, 1946 |
| 2,419,205 | Feldman | Apr. 22, 1947 |
| 2,422,182 | Bryant | June 17, 1947 |
| 2,423,104 | Labin | July 1, 1947 |
| 2,426,218 | Hopgood | Aug. 26, 1947 |
| 2,433,002 | Norton | Dec. 23, 1947 |
| 2,471,264 | Doherty | May 24, 1949 |
| 2,541,030 | Busignies | Feb. 13, 1951 |